United States Patent [19]

Turner

[11] Patent Number: 5,767,482
[45] Date of Patent: Jun. 16, 1998

[54] LASER BARRIER MATERIAL AND METHOD

[75] Inventor: Stephen C. Turner, Bristol, Great Britain

[73] Assignee: Rolls Royce plc, London, Great Britain

[21] Appl. No.: 674,679

[22] Filed: Jul. 2, 1996

[30] Foreign Application Priority Data

Jul. 14, 1995 [GB] United Kingdom ............. 9514447

[51] Int. Cl.$^6$ ............... B23K 26/00; B23K 26/18
[52] U.S. Cl. ................................... 219/121.71
[58] Field of Search ................ 219/121.7, 121.71

[56] References Cited

U.S. PATENT DOCUMENTS

| | | | |
|---|---|---|---|
| 3,596,045 | 7/1971 | Steigerwald | 219/121.71 |
| 4,873,414 | 10/1989 | Ma et al. | 219/121.71 |
| 5,011,626 | 4/1991 | Ma et al. | 219/121.7 |
| 5,049,722 | 9/1991 | Corfe et al. | 219/121.71 |
| 5,140,127 | 8/1992 | Stroud et al. | 219/121.71 |
| 5,222,617 | 6/1993 | Gregory et al. | 219/121.71 |

FOREIGN PATENT DOCUMENTS

| | | |
|---|---|---|
| A2-0 347053 | 12/1989 | European Pat. Off. |
| A1-0 454223 | 10/1991 | European Pat. Off. |
| A1-2 482 495 | 11/1981 | France. |
| A-58-125677 | 7/1983 | Japan. |
| 4-41090 | 2/1992 | Japan. |
| 4-172194 | 6/1992 | Japan. |

OTHER PUBLICATIONS

H.W. Fowler and F.G. Fowler, The Concise Oxford Dictionary of Current English, 8$^{th}$ Edition by R.E. Allen, p. 1065.

*Primary Examiner*—Geoffrey S. Evans
*Attorney, Agent, or Firm*—Oliff & Berridge, PLC

[57] ABSTRACT

A laser barrier material for preventing far-wall strike during a laser drilling operation comprising a finely divided crystalline material, preferably a metal salt which is thermally stable and possesses a high melting point such as sodium chloride. The barrier material may be introduced into the interior of a component by pouring through an aperture or by making it into a paste with water and injecting it. The material is then subsequently removed by washing the component with water.

8 Claims, 1 Drawing Sheet

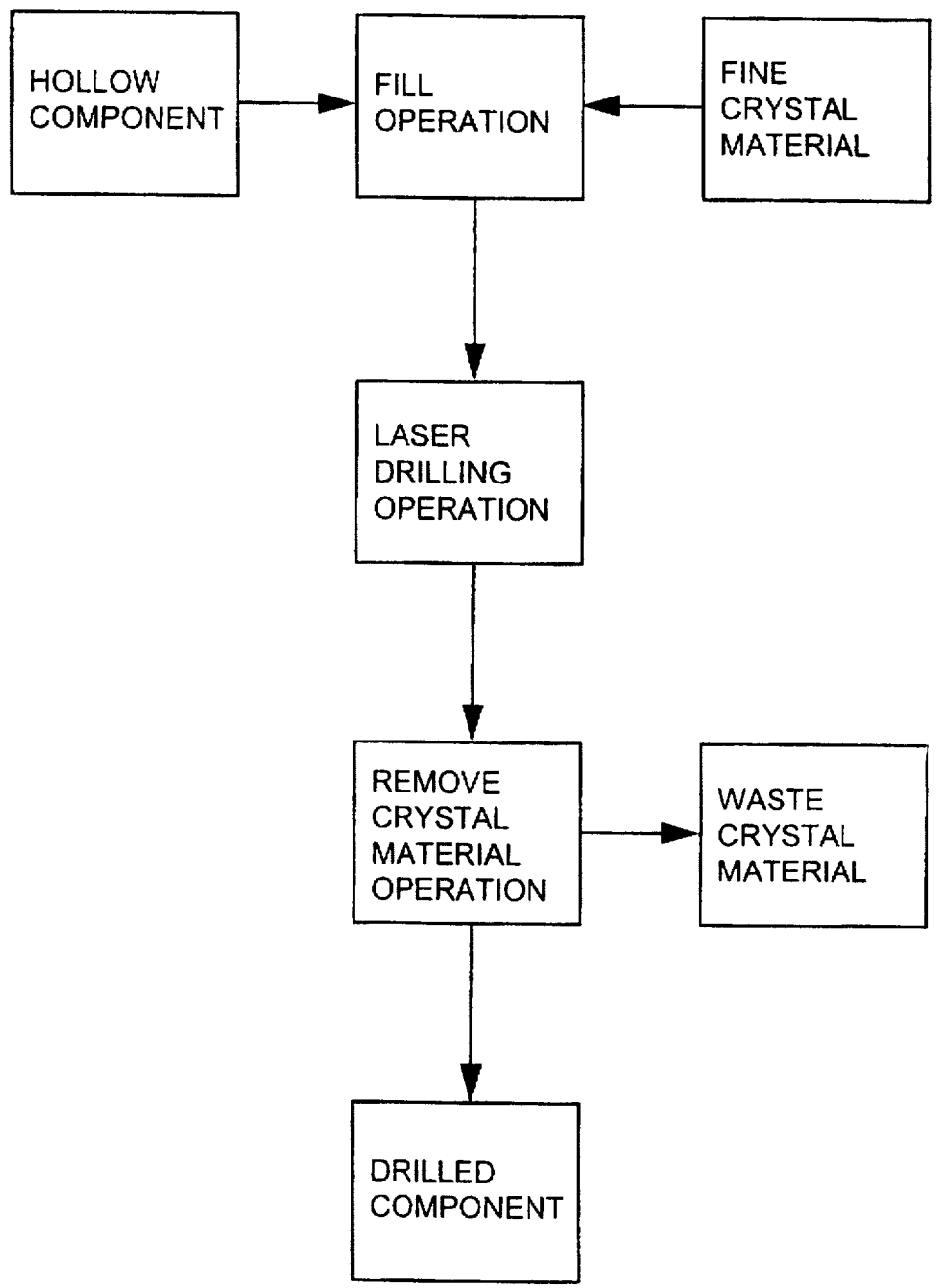

5,767,482

LASER BARRIER MATERIAL AND METHOD

BACKGROUND OF THE INVENTION

The invention concerns a laser barrier material and method. In particular the invention concerns the use of a crystalline material for filling cavities to protect against far-wall strike during laser drilling operations.

The use of lasers to drill, or trepan, holes in a variety of materials is now a well-known and widely-used technique. It has found particular application in the manufacture of aeroengine components, for example in drilling cooling film effusion holes in hollow blades. One difficulty inherent in this process, however, is the prevention of far-wall strike by the laser beam when it breaks through the wall being drilled. Obviously, providing the laser beam is switched off promptly minimum damage is caused but, nevertheless, in high-integrity components such as aeroengine turbine blades any damage is undesirable and to be avoided if possible. Another difficulty arises from spattering on internal surfaces of material inevitably vaporised during the drilling process. It is virtually impossible to remove this spattered material from the inside of the hollow cavity, which ultimately is detrimental to the cooling efficiency of the blade.

Steps are normally employed to minimise, and if possible prevent, far-wall strike by filling the internal cavity of the component with a material that will absorb or disperse the laser beam. A popular material for the purpose is polytetrafluoroethylene (PTFE) either in sheet form or as flakes suspended in a suitable carrier. Although PTFE produces reasonably satisfactory results as far as far wall strike protection is concerned, difficulties have been encountered with either insertion or removal or both. Sheet materials obviously require large access apertures which are not normally available in small components like blades. Carrier materials such as wax which can be injected through small holes but are difficult to remove completely afterwards. An alternative carrier comprising a thixotropic medium in which are suspended PTFE particles promise to be easier to remove but tend to collapse under the pressure of injection and fail to maintain a sufficient density of particles in suspension. All-in-all therefore the prevention of far-wall strike during laser drilling constitutes a long standing problem to which no satisfactory solution has hitherto emerged. Internal spatter, however, is not so well contained when the internal cavity on the drilled component is not thoroughly filled with an effective absorber.

SUMMARY OF THE INVENTION

The present invention is intended to remedy these deficiencies and to provide a material which is effective to prevent far wall strike, to absorb internal spatter, and is both easy to fill and remove.

According to one aspect of the invention there is provided a laser barrier material comprising a finely-divided crystalline material. Preferably the crystalline material is used in dry form or as a paste.

Preferably the crystalline material remains substantially unaffected by the heat of an incident laser beam and, further, is soluble in water.

According to another aspect of the present invention a method of laser drilling into a hollow component includes the step of filling the internal cavity of the component with a crystalline material as claimed in any one of the appended claims, performing the laser drilling operation, and removing the crystalline material.

BRIEF DESCRIPTION OF THE DRAWING

The Figure is a flow-chart detailing the steps of the method according to the invention.

DETAILED DESCRIPTION OF PREFERRED EMBODIMENTS

The basis of the invention is the discovery that a finely divided crystalline material of an inorganic compound or a metal salt will provide an effective barrier to a laser beam. In order to be effective the crystalline material must be substantially unaffected by the incidence of the laser drilling beam, at least for the length of time it will be exposed to the laser beam. The material, for example, must not be combustible although it is probably immaterial if a few crystals coalesce together providing bulk material shrinkage is negligible.

In dry form the crystalline material should be sufficiently finely-divided to permit its introduction to the interior of the component to be drilled. For filling more difficult components having, for example, a complex internal structure of cooling passages, the crystalline material may be formed into a paste and injected into the component. Once filled the component may then be low-baked to dry the paste and recrystallise the material. It may be necessary, therefore, to temporarily block other apertures through which the fine crystals or paste may spill-out.

After completing the laser drilling operation or operations the barrier material is removed from the interior of the component. Any plugs etc. inserted to avoid spillage may be removed and as much of the material allowed to pour out as possible. Such material may be reusable in further laser drilling operations. Material remaining within the component interior such as crystals fused together is removed by flushing the component through with water to dissolve the crystals.

A material which has been found ideally suited to meet the above requirements is sodium chloride, i.e. common salt. Moreover it is readily and cheaply available in almost pure form, for example common table salt is normally found to have a purity of the order of 99.9%. The grain size, if necessary, may be easily reduced by grinding to facilitate its pouring in dry form into hollow components, and high filling densities may be achieved easily by gently vibrating the component to improve grain packing.

Sodium chloride has a high melting point of 801° C. and a boiling of 1013° C. It is water soluble at a rate of 35.7 g per 100 cc at 0° C., and possesses a density of 2.165. It is also anhydrous, that is, in crystalline form no water is present in liquid form in the material. Thus, sodium chloride fulfils the preferred requirements for a laser barrier material of being anhydrous, thermally stable and having a high melting point.

A preferred material should also be non-hazardous to component material and to process operators. Although sodium chloride is well known as a corrosive agent in the case of steel alloys, at least over a period of prolonged exposure, nickel based alloys as commonly in use for the manufacture of aero-engine turbine blades are non susceptible and appear impervious to its effects. Titanium, which is another common aeroengine material is, however, susceptible to attack by chlorine but its use is restricted to cooler sections of engines, e.g., the compressor, where it is not necessary to employ internally cooled blades needing surface effusion cooling holes. Another potentially suitable metal salt is potassium chloride, nitrates are less suitable as generally they decompose at lower temperatures and tend to form hazardous compounds.

However, simply pouring the crystals in through an aperture is found not to be a particularly efficient way of filling a hollow component with a complex internal structure such as an air cooled aeroengine turbine blade.

An alternative preferred method is as follows: first the crystalline sodium chloride material is mixed with sufficient water to form a paste, which is then injected into the interior of the blade. The blade is then put into an oven and low-baked to dry out the paste and to recrystallise the sodium chloride. The crystals reform from a myriad of nucleation sites forming tightly packed small crystals comparable to the size of the original dry crystals. In tests to observe the structure of the recrystallised material it was found, even where the sodium chloride formed a block of material it was composed not of a monolithic crystal but of a myriad of minute crystals. An incident laser beam would, therefore, encounter and be scattered by a large number of crystal boundaries within the recrystallised material, just as in the original dry form.

The recrystallised sodium chloride may be removed from the interior of a hollow component by dissolving it in warm or hot water. Cold water will, obviously, work but more slowly, also the natural agitation of convection currents in hot water is beneficial. If desired, or if necessary, some form of artificial agitation may be introduced to speed-up the dissolution process. It is possible, for example, to immerse the components boiling water. Analysis has shown that nickel alloy turbine blades remain unaffected by this process and by sodium chloride. Inspection of the components also shows that laser dross or spatter is prevented from adhering to the internal surfaces and is carried away by removal of the crystallised barrier material. It has also been shown that the recast layer around the laser drilled holes is unaffected by the presence of sodium chloride.

I claim:

1. A method of laser drilling into a hollow component having an internal cavity, including the steps of: filling the internal cavity of the component with a finely-divided crystalline material, which finely-divided crystalline material is thermally stable and soluble in water, performing a laser drilling operation through the component into the internal cavity and removing the material.

2. A method according to claim 1 wherein the crystalline material is a metal salt.

3. A method according to claim 2 wherein the crystalline material is sodium chloride.

4. A method as claimed in claim 3 wherein the sodium chloride is utilised in dry form and includes the step of filling the component by pouring the dry material into the internal cavity of the component.

5. A method as claimed in claim 1 wherein the crystalline material is utilised in dry form and includes the step of filling the component by pouring the dry material into the internal cavity of the component.

6. A method as claimed in claim 1 wherein the crystalline material is first mixed with water to form a paste, the component is filled by injecting the paste into the internal cavity of the component, and the material is then recrystallized.

7. A method as claimed in claim 6 wherein the step of recrystallising of the material includes heating the filled component.

8. A method as claimed in claim 1 further including following the laser drilling operation, a step of removing the crystalline material by dissolving residual material in water.

* * * * *